(12) United States Patent
Baxter et al.

(10) Patent No.: US 6,412,049 B1
(45) Date of Patent: *Jun. 25, 2002

(54) METHOD FOR MINIMIZING CPU MEMORY LATENCY WHILE TRANSFERRING STREAMING DATA

(75) Inventors: Brent S. Baxter, Hillsboro; John I. Garney, Portland; Stephen S. Pawlowski, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,528

(22) Filed: Dec. 16, 1999

(51) Int. Cl.$^7$ .............................................. G06F 13/18
(52) U.S. Cl. ...................................................... 711/158
(58) Field of Search .............................. 711/154, 158, 711/167, 169; 710/45, 117

(56) References Cited

U.S. PATENT DOCUMENTS

| | | | |
|---|---|---|---|
| 4,446,525 A | * 5/1984 | Hoch et al. | 364/474 |
| 5,758,105 A | 5/1998 | Kelley et al. | |
| 6,049,891 A | * 4/2000 | Inamoto | 714/6 |
| 6,052,751 A | * 4/2000 | Runaldue et al. | 710/107 |
| 6,091,740 A | * 7/2000 | Karasawa | 370/458 |
| 6,266,702 B1 | * 7/2001 | Darnell et al. | 709/236 |

FOREIGN PATENT DOCUMENTS

| | | |
|---|---|---|
| EP | 0 715 261 A1 | 6/1996 |
| WO | WO 96 13777 | 5/1996 |

* cited by examiner

Primary Examiner—Kevin L. Ellis
(74) Attorney, Agent, or Firm—Blakely, Sokoloff, Taylor & Zafman LLP

(57) ABSTRACT

Access to a memory is arbitrated by defining a schedule period having service periods for isochronous and asynchronous memory requests. Received isochronous requests are serviced during their respective service periods, and if an asynchronous request is received during an isochronous service period, the isochronous service period is suspended and the asynchronous request is serviced, provided that time remains in the asynchronous service period or there is no isochronous request pending. Otherwise, service of the asynchronous request is delayed until the next schedule period. Service time for isochronous request are therefore guaranteed and scheduled around asynchronous memory request. If there are any maintenance events signaled, the service period for the asynchronous request may be correspondingly decreased while the maintenance event is performed.

29 Claims, 3 Drawing Sheets

METHOD FOR MINIMIZING CPU MEMORY LATENCY WHILE TRANSFERRING STREAMING DATA

BACKGROUND OF THE INVENTION

1. Field of the Invention

The invention relates generally to computer systems, and in particular, to computer systems that employ a method for minimizing central processing unit (CPU) memory latency while transferring streaming data.

2. Background Information

Computer systems that employ a CPU often utilize a memory controller and a graphics controller. The memory controller controls access by the CPU and other agents to a system memory. The graphics controller controls the display of data provided by the CPU onto a display screen, such as a cathode ray tube (CRT), using a frame buffer. Both the system memory and the frame buffer are typically implemented using arrays of Dynamic Random Access Memory (DRAM). In some computer systems, the frame buffer and the system memory are unified into a single shared memory, known as a Unified Memory Architecture (UMA).

Computer systems such as these have traditionally processed all requests for access to memory as asynchronous requests, which have included requests involving graphics data. Asynchronous requests are generally at a non-deterministic rate (e.g., random). An example of when an asynchronous request is generated is when an action, such as a mouse click or a keystroke, from an input/output (I/O) device causes an interrupt. In response to the interrupt, the CPU makes one or more asynchronous requests to access memory in order to store its current operation and to locate instructions associated with servicing the interrupt.

The time associated with accessing memory, retrieving the requested data from memory, and making the retrieved data available to a requesting agent is sometimes referred to as "latency." Asynchronous requests are generally latency-sensitive. That is, the quality of service degrades as the length of time to access the memory and to process the request increases. For example, it is undesirable to computer users to wait an inordinate amount of time before their mouse click results in activity. Accordingly, conventional computer systems attempt to reduce latency as much as possible by granting asynchronous requests from the CPU priority over other memory requests.

Isochronous memory requests have become increasingly common in recent years. Examples of isochronous transactions include audio, video, or other real-time data transfers to or from I/O devices that use "streaming" technology such that the data is processed as a steady and continuous stream. Streaming technology is commonly used with the Internet, for example, where audio or video is played as the streaming data is downloaded, which is in contrast to some computer systems where an entire file has to be completely downloaded before being played.

Isochronous requests, in contrast to asynchronous requests, are deterministic. That is, the amount of information needed in a given period of time or the rate of information that is transferred in a given period of time are generally known. For instance, when writing a video image to a display screen from a frame buffer, it is known that the video frames are sent to the display screen at a rate of 30 frames per second, and so the number of lines per second, bits per line, bytes per pixel, etc. are known. Isochronous requests are generally more tolerant of a specific latency value but are very sensitive to extreme variations in latency, even if these extremes occur infrequently. Once an isochronous stream begins, continuous data transfer becomes important and must be maintained. Therefore, the measure of quality in isochronous data transfer is defined by the amount of data that can be lost without significantly affecting the audio or video quality. Lost data is directly related to extreme latency variations. Extreme latencies can cause data loss. If the data cannot be accessed in time, it is no longer useful.

Traditional computer systems have relied on various forms of priority-based memory arbitration, including priority, round-robin sequencing, time slice limits, high watermarks, etc., to determine the order in which an agent requesting access to memory should be serviced. While these kinds of arbitration schemes do function to reduce CPU memory latency, audio, video, and other streaming I/O memory traffic are typically given lower priority, which can therefore cause a streaming agent to be "starved out" or sufficiently delayed in accessing memory, thereby resulting in lost data. Assigning higher priority to streaming I/O memory traffic results in an improvement of latency for the streaming data, but doing so is at the expense of increased CPU memory latency. Accordingly, improvements are needed in the scheduling and processing of mixtures of asynchronous and isochronous memory requests.

SUMMARY OF THE INVENTION

A method according to an embodiment of the invention includes defining a schedule period for first and second types of memory requests, receiving a memory request of the second type, servicing the received memory request of the second type during the schedule period if time remains in the schedule period to service the received memory request of the second type, and otherwise servicing a pending memory request of the first type.

BRIEF DESCRIPTION OF DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a method for minimizing CPU memory latency while transferring streaming data are described in detail herein. In the following description, numerous specific details are provided, such as the description of various computer system components in FIG. 1, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention. Further, the terms "isochronous" and "streaming" are used interchangeably or in combination herein, and are intended to be more or less analogous.

Figure 1:
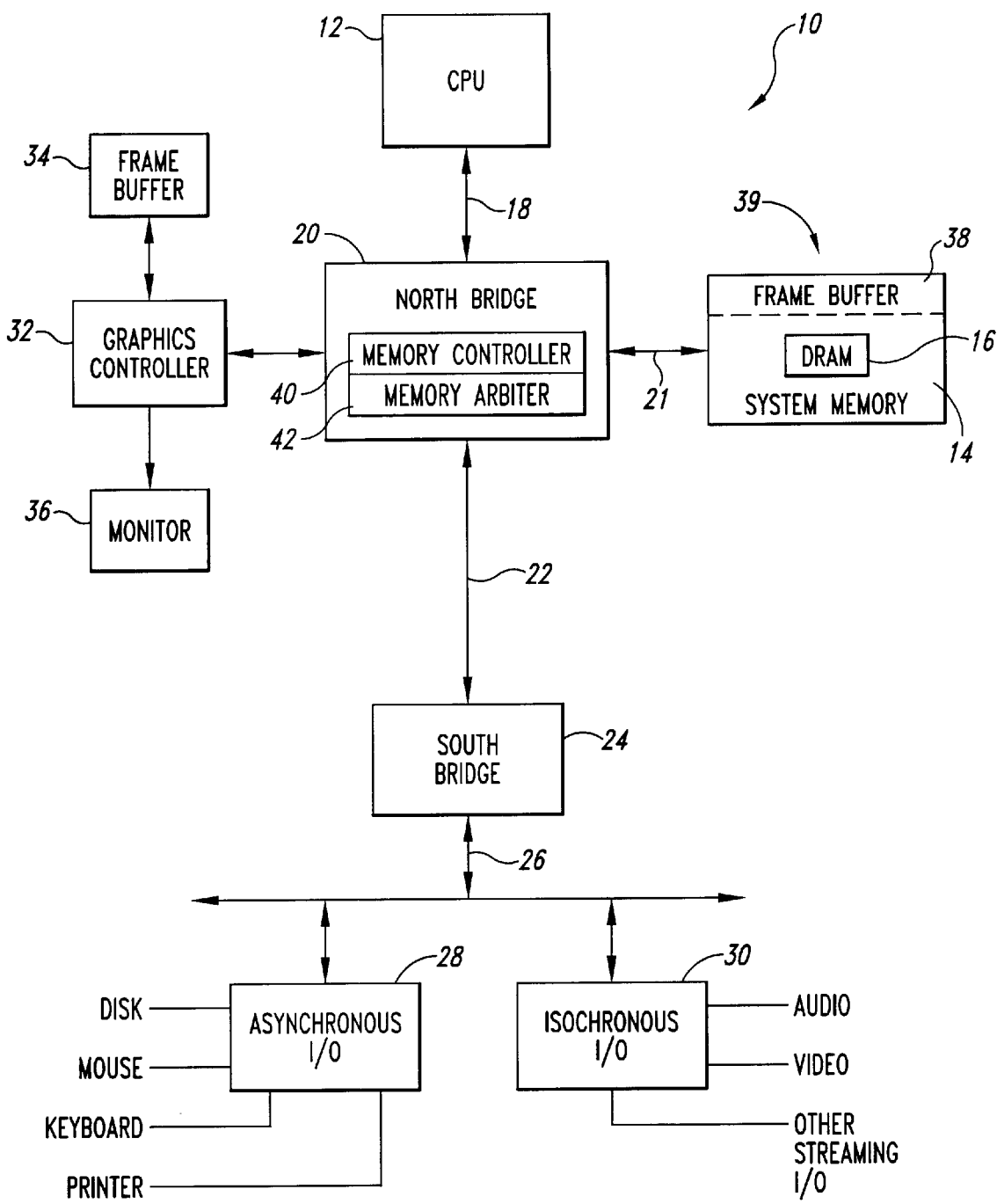
FIG. 1 is a block diagram of a computer system that can be used in accordance with an embodiment of the invention.

Referring first to FIG. 1, shown generally at 10 is a computer system that can implement an embodiment of the present invention. The computer system 10 has as its principle components a CPU 12 and a system memory 14 comprising rows of Dynamic Random Access Memories (DRAMs) 16. The CPU 12 is coupled by a host bus 18 (sometimes referred to as a "front side bus") to a Host-I/O bridge 20 (sometimes referred to as a "North Bridge"). The Host-I/O bridge 20 is in turn coupled to the system memory 14 by a memory bus 21.

The Host-I/O bridge 20 is coupled by a Peripheral Component Interconnect (PCI) bus 22 to a PCI-to-ISA bridge 24 (sometimes referred to as a "South Bridge"). An ISA or PCI bus 26 couples one or more asynchronous I/O chipsets 28 and one or more isochronous I/O chipsets 30 to the PCI-to-ISA bridge 24. The asynchronous I/O chipset 28 supports asynchronous data transfer from a disk drive, mouse, keyboard, and printer, for example. The isochronous I/O chipset 30 supports audio, video, modem, network, or other streaming I/O.

The Host-I/O bridge 20 is coupled to a graphics controller 32. The graphics controller 32 accesses a local frame buffer 34 for the purposes of storing and retrieving graphics data stored therein for ultimate display on a monitor 36. The monitor 36 can be a CRT, liquid crystal display, or other display device. For systems that use the UMA configuration, the local frame buffer 34 is replaced by partitioning a portion of the system memory 14 to create a frame buffer 38, resulting in a shared memory 39.

As evident from the block diagram of the computer system 10 shown in FIG. 1, many different agents (e.g., the CPU 12, the graphics controller 32, asynchronous devices connected to the asynchronous I/O chipset 28, streaming devices connected to the isochronous I/O chipset 30) can request access to the shared memory 39. Because requests to the shared memory 39 need to go through the memory bus 21, latency or lost data can become significant if these agents have concurrent requests to access the shared memory 39. Accordingly, the Host-I/O bridge 20 includes a memory controller 40 and a memory arbiter 42 to control access to the shared memory 14. The memory arbiter 42 will be described in further detail below.

Although the memory arbiter 42 is shown in the computer system 10 of FIG. 1 as residing in the Host-I/O bridge 20, it is to be appreciated that the memory arbiter 42 can reside in other components of the computer system 10. For example, the memory arbiter 42 can be located in the PCI-to-ISA bridge 24. Further, it is also possible to include more than one memory arbiter 42 in the computer system 10. Therefore, the present invention is not limited by the number of memory arbiters 42 or by their specific location.

According to an embodiment of the present invention, the memory arbiter 42 performs an arbitration scheme that supports the real-time nature of streaming I/O devices, while at the same time preserving low latency aspects of memory service for the CPU 12 and other asynchronous I/O devices. Scheduled memory service for streaming I/O devices is guaranteed, thereby providing advantages over prior art computer systems where priority given to the CPU 12 can starve out streaming I/O devices and other isochronous memory traffic. Further, guaranteed service of isochronous requests is accomplished while minimizing possible increases in average latency for asynchronous memory requests.

According to an aspect of an embodiment of the arbitration scheme, access time to the shared memory 39 by one or more agents (e.g., the CPU 12 or a video device coupled to the isochronous chipset 30 of FIG. 1) is defined by a sequence of memory schedule periods. Based on various design parameters of the computer system 10, the duration of each schedule period is predetermined or fixed. For example, if a system clock frequency of the computer system 10 is at 100 MHz, each schedule period can span 128 clock cycles or approximately 1.28 microseconds according to one embodiment of the invention.

Figures 2, 3:
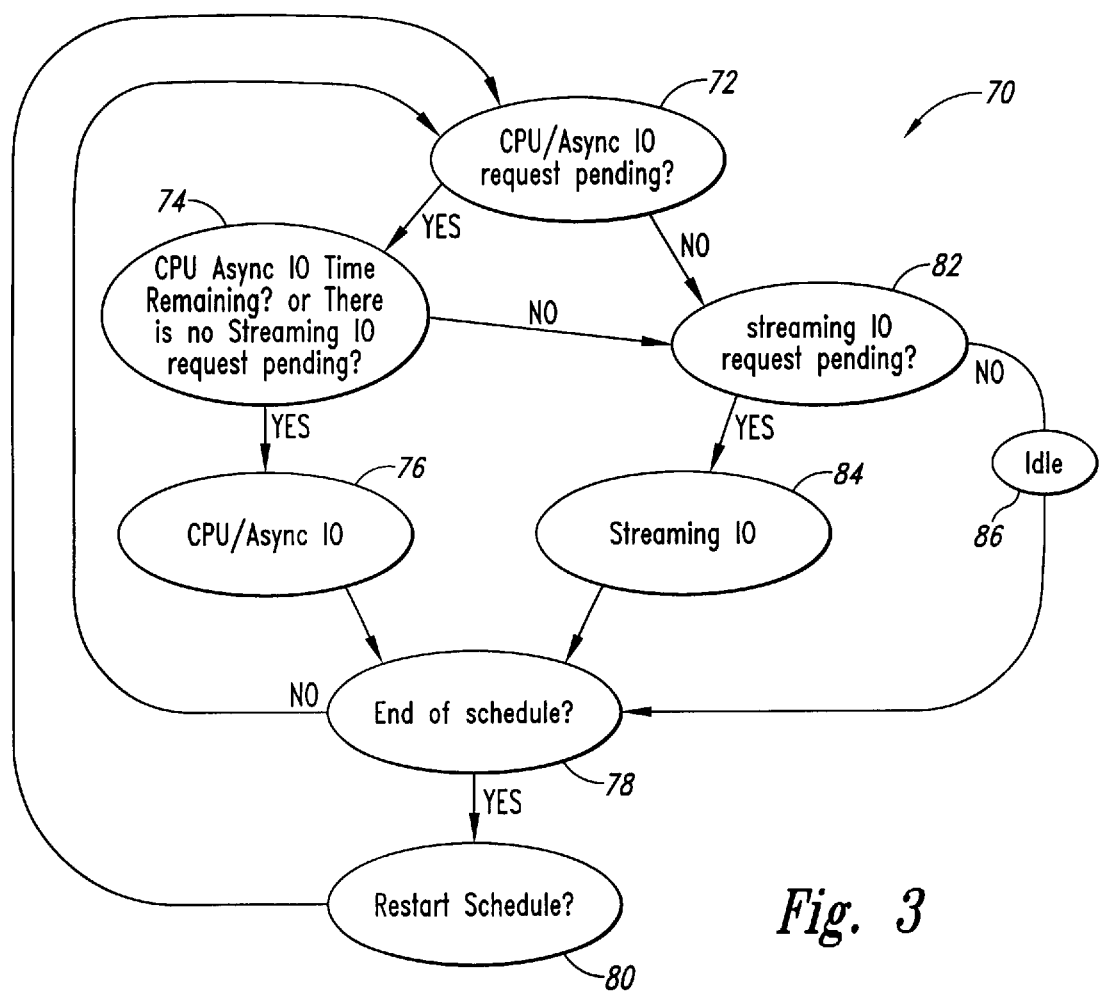
FIG. 2 is a table illustrating allocation of a memory schedule period according to an embodiment of the invention.
FIG. 3 is a flow chart illustrating an embodiment of a method that can be used in the computer system of FIG. 1 to arbitrate memory requests.

FIG. 2 is a table 50 showing an example of the allocation of time for a schedule period 52 lasting 128 clock cycles. The time in the schedule period 52 is allocated among several resource blocks 53. That is, each resource block is given a "service period" within the schedule period 52. Each schedule period 52 comprises a sequence of service periods, with the service period being simply a pre-allocation of time to service an isochronous or asynchronous request. If there are no isochronous or asynchronous requests pending, then the service periods occur as idle time, or optimization schemes of embodiments of the invention can allocate the idle time to pending memory requests.

The service periods X, Y, Z are allocated to maintenance blocks 54. A Refresh maintenance operation having a service period X is associated with refreshing DRAMs 16 in the shared memory 39. An Ical maintenance operation having a service period Y is associated with current calibration for the DRAMs 16, and a Tcal maintenance operation having a service period Z is associated with temperature calibration for the DRAMs 16.

The number of clock cycles needed to complete the service periods X, Y, Z may vary from one computer system 10 to another depending on the type of DRAMs 16 used. Further, it is not required for every schedule period 52 to include all three service periods X, Y, Z. For instance, there may be one or more schedule periods 52 when no service periods X, Y, Z are signaled, or there may be other schedule periods 52 when any number of the three service periods X, Y, Z are signaled.

According to an embodiment of the present invention and as will be explained in further detail below, the service periods X, Y, Z, if they are signaled, are not preempted by asynchronous or isochronous requests. Also, if any of the service periods X, Y, Z are not signaled in a given schedule period 52, that available service time can be allocated in that schedule period 52 to service asynchronous requests from the CPU 12 or from other I/O devices.

In the table 50 of FIG. 2, the Tcal maintenance operation is allocated a service period of Z=36 clock cycles, and the other maintenance operations are not signaled in that particular schedule period 52, although they may be signaled in subsequent schedule periods. A display block 56, associated with isochronous video resolution and refreshing data transactions for the graphics controller 32 and the monitor 36, is allocated a service period of 48 clock cycles. An isochronous hublink (ISO_HL) block 56 associated with isochronous traffic, such as audio, through the PCI-to-ISA bridge 24, is allocated a service period of 14 clock cycles. Similarly, a service period of 4 clock cycles is allocated to an isochronous video capture block 60. These allocations leave 30 clock cycles out of the 128 clock cycles in the schedule period 52 to service asynchronous requests from the CPU 12 or from I/O devices (e.g., a CPU_I/O block 62).

In one embodiment of the invention, the schedule period 52 is fixed, for example at 128 clock cycles, for all schedule periods. The length of the schedule period 52 can be preset at the manufacturing stage. It is also possible to provide other embodiments of the invention where the length of one or more schedule periods 52 is set during startup of the computer system 10, as the computer system 10 makes an initial determination of the number of potential streaming agents that are coupled to the computer system 10 at startup. It is further possible to provide embodiments where the length of one or more schedule periods 52 dynamically change while the computer system 10 is operating, as agents generating isochronous traffic are identified.

Similarly, within one or more schedule periods 52, the maximum length of the service periods X, Y, Z for the maintenance blocks 54 or of the service periods for the display, ISO_HL, video capture, and CPU_I/O blocks 56–62 can also be preset or dynamically changed. If the lengths of the service periods for the display, ISO_HL, and video capture blocks 56–60 shown in the table 50 of FIG. 2 are preset, these preset service periods lengths can be computed based on known requirements for these types of isochronous traffic. Lengths of the service periods for the various isochronous blocks 56–60 can be dynamically set at startup, for example, if the computer system 10 determines that there is no video capture block 60 (e.g., there is no video capture agent, such as a camcorder) coupled to the computer system 10, and so the lengths of the service periods of the other isochronous blocks 56 and 58 or of the CPU_I/O block 62 are correspondingly incremented. Therefore, it is to be appreciated that the invention is not limited by the specific length of schedule periods or service periods, or whether the lengths are fixed or variable.

According to one embodiment of the invention, the number of isochronous streaming requests is known at the beginning of each schedule period 52. This is accomplished when the memory controller 40, the memory arbiter 42, or a bus master (not shown) checks queues present in buffers (not shown) that are coupled to the shared memory 39, and makes a determination as to whether there is an isochronous request present in the buffers. A buffer can be used for each agent requesting access to the shared memory 39, and as one request is serviced, its corresponding buffer is emptied. The buffer is then filled with a subsequent memory request, if any. Therefore, by polling each buffer, for example, the number of isochronous requests can be determined at the beginning of each schedule period 52, and so the memory arbiter 42 can determine whether there will be adequate time in the schedule period 52 to service both pending isochronous requests and any asynchronous requests that are received later during the schedule period 52. Additionally, by knowing the number of isochronous requests before the start of the schedule period 52, the memory arbiter 42 can know beforehand whether or not there will be unused isochronous service periods that can be transferred to service asynchronous requests. In particular, if the memory arbiter 42 determines at the beginning of the schedule period 52 that there will be one or more unused isochronous service periods, it can immediately transfer the unused time to the asynchronous service period in order to service asynchronous requests as early as desired.

In another embodiment of the invention, it is not required to know the number of isochronous requests before the start of the schedule period 52 because each of the isochronous resource blocks 56–60 already have been pre-allocated with service time. Thus, the isochronous resource blocks 56–60 are guaranteed service time, regardless of whether they will use all of the service time, some of it, or none of it. Any resulting unused isochronous service time can be transferred to service asynchronous requests. Also, as will be described in further detail below, the memory arbiter 42 can service an asynchronous request if time remains in the asynchronous service period. This determination is independent of the number of isochronous requests that are pending.

According to another embodiment, the maximum time required to complete a memory request is determined before that request is processed. In particular for streaming requests, the time required to complete a given schedule period's 52 streaming requests is known before the start of that schedule period 52. Because isochronous traffic is deterministic, as described previously above, various known implementation techniques can be used to determine these time requirements. By knowing the maximum time required to complete an isochronous or asynchronous memory request, the memory arbiter 42 can make a determination as to whether a single memory request will require completion in a single or in multiple schedule periods 52, and can therefore also delay service of an asynchronous request so that the time to service pending isochronous requests is guaranteed. Furthermore, in an optimization scheme for one embodiment of the invention, if the known time required to complete a streaming memory request (e.g., a streaming memory request from the display block 56) is less than the service period allocated for that streaming request in that schedule period 52, then the remainder of the unused service period can be transferred to the service period of the CPU_I/O block 62. Hence, the shared memory 39 need not remain idle during that unused portion of the isochronous service period, but rather, this service time can be transferred to an asynchronous request that needs the time.

An embodiment of the invention is also based on the feature that asynchronous memory requests are distinguishable from isochronous requests. Known techniques can be used to distinguish between these two types of requests.

FIG. 3 is a flow chart 70 illustrating a manner in which asynchronous and isochronous requests are arbitrated by the memory arbiter 42 for a single schedule period 52. For simplicity of explanation, it is assumed in the flow chart 70 that before the schedule period 52 begins, an initial service period for the CPU_I/O block 62 is set or pre-allocated, although this is not a requirement. As described above, the initial service period for the CPU_I/O block 62 is based on the amount of time remaining after the time required for the isochronous requests in that schedule period 52 is pre-allocated. Also, the service period for the CPU_I/O block 62 is based on whether there is one or more maintenance operations (e.g., Refresh, Ical, Tcal) signaled for that schedule period 52. If there is no maintenance operation signaled, then the service period for the CPU_I/O block 62 is preset at a maximum. However, this preset service period for the CPU_I/O block 62 is correspondingly reduced by the amount of time needed to service one or more maintenance operations, if there are any, that are signaled for that schedule period 52. For instance, the Refresh maintenance operation can occur every four schedule periods, and the Ical can occur every 2048 schedule periods. Therefore, the preset service period for the CPU_I/O block 62 is correspondingly reduced in duration at the beginning of these schedule periods so that the maintenance operation(s) can be given to priority and serviced by the memory arbiter 42.

After a maintenance operation, if any, is completed during the first part of the schedule period 52, the memory arbiter 42 services the remaining resource blocks 53 of FIG. 2 according to the following priority, for example: display block 56, ISO_HL block 58, video capture block 60 and CPU_I/O block 62. Other prioritization sequences can be implemented, and so the present invention is not limited by the specific order in which individual isochronous resource blocks are serviced.

According to the flowchart 70 of FIG. 3, if the computer system 10 is in one of the isochronous service periods and an asynchronous request occurs at step 72, then the memory arbiter 42 makes two determinations at step 74 in order to decide whether to service the asynchronous request. The memory arbiter 42 determines whether time still remains in the CPU_I/O block's 62 service period, or whether there is no isochronous request pending. If the memory arbiter 42 determines that time remains for asynchronous operations, then a counter for the current isochronous service period is suspended, and the asynchronous request is processed at step 76, accompanied by correspondingly decrementing an asynchronous service period counter.

Likewise, if there are no isochronous requests pending, then the asynchronous request is serviced at step 76. So long as there are no isochronous requests pending, the asynchronous request is serviced at step 76, regardless of the amount of time remaining in the CPU_I/O block's 62 service period (even if it is zero). If the asynchronous request is serviced under this condition, the isochronous service period counter (rather than the asynchronous service period counter, which may be at zero or other low value) is correspondingly decremented while servicing the asynchronous request, thereby ensuring that the schedule period 52 maintains the same time duration and that subsequent schedule periods begin at regular intervals (e.g., every 1.28 microseconds). This optimization feature of servicing asynchronous requests if there are no pending isochronous requests helps to reduce or eliminate idle memory time. Otherwise, the asynchronous request would have to be delayed until a subsequent schedule period, while the memory arbiter 42 waits for the remaining unused isochronous service periods to expire.

After completing service of that asynchronous request, the counter for the suspended isochronous service period, if any, is allowed to continue. Thereafter, the memory arbiter 42 checks at step 78 whether the end of the schedule period 52 has arrived. If it has, then the next schedule period starts at step 80, and the arbitration scheme repeats for the next schedule period, where maintenance operations are performed, if any are signaled, followed by servicing isochronous requests and suspending service of the isochronous requests if an asynchronous request is received.

If at step 74, the memory arbiter 42 determines that there is no time left in the asynchronous service period and there are isochronous requests pending, then the asynchronous request must wait to be serviced until the next schedule period. In such a situation, the isochronous requests are serviced at steps 82 and 84, and thereafter, as before, the memory arbiter 42 checks at step 78 whether the end of the schedule period 52 has been reached. A rationale for delaying service of the asynchronous request under this analysis is that to maximize quality of service, the isochronous requests should not be unreasonably delayed, especially if asynchronous requests have already used up their allotted service periods.

Variations are possible according to embodiments of the invention. For example, in one embodiment, if an asynchronous request is received at step 72 and the amount of time remaining in the asynchronous service period is insufficient to complete service of that asynchronous request, then the entire service of the asynchronous request is delayed until a subsequent schedule period. In another embodiment, a portion of the asynchronous request can be serviced in one schedule period, and then the service can be completed in a subsequent schedule period. In both situations, time in the subsequent schedule period is dedicated to completion of the asynchronous request (thereby possibly reducing the amount of time to service isochronous request during that subsequent schedule period) in order to ensure that the service of the asynchronous request is not unreasonably delayed to yet another subsequent schedule period.

If at step 78, the end of the schedule period 52 has not yet arrived after completing the asynchronous request at step 76, after completing an isochronous request at step 84, or after one of the isochronous service periods has ended, then the next sequential isochronous service period(s) occurs. During these subsequent isochronous service periods, one or more asynchronous requests may be received again at step 72, and the arbitration scheme described above repeats.

In another situation, if no asynchronous requests are made at step 72, then the memory arbiter 42 checks at step 82 whether an isochronous request is pending. If there is an isochronous request pending, then the request is serviced at step 84, until the end of the schedule period 52 is reached at step 78. If there are no isochronous requests pending at step 82, then their corresponding isochronous service periods are still allowed to occur (e.g., isochronous service period counters continue), although the shared memory 39 is essentially idle during these isochronous service periods, as shown at step 86. Again, to optimize operation, this idle time can instead be granted to asynchronous request that may be pending during that particular schedule period 52.

A few features of the embodiments of the arbitration scheme described herein should be noted. First, it is inherent in the scheme that whenever an asynchronous or isochronous request is serviced, the total time remaining in the schedule period 52 is decreased. Second, whenever an isochronous or asynchronous request is received, the time remaining in the corresponding service period is decreased as the request is serviced. Third, both asynchronous and isochronous memory requests may arrive at arbitrary times within a schedule period 52. Isochronous requests arriving in one schedule period 52, however, can be serviced in the next schedule period or serviced in the schedule period in which they arrived if time remains. Accordingly, isochronous requests for one schedule period 52 are distinguishable from those of another schedule period.

Figure 4:
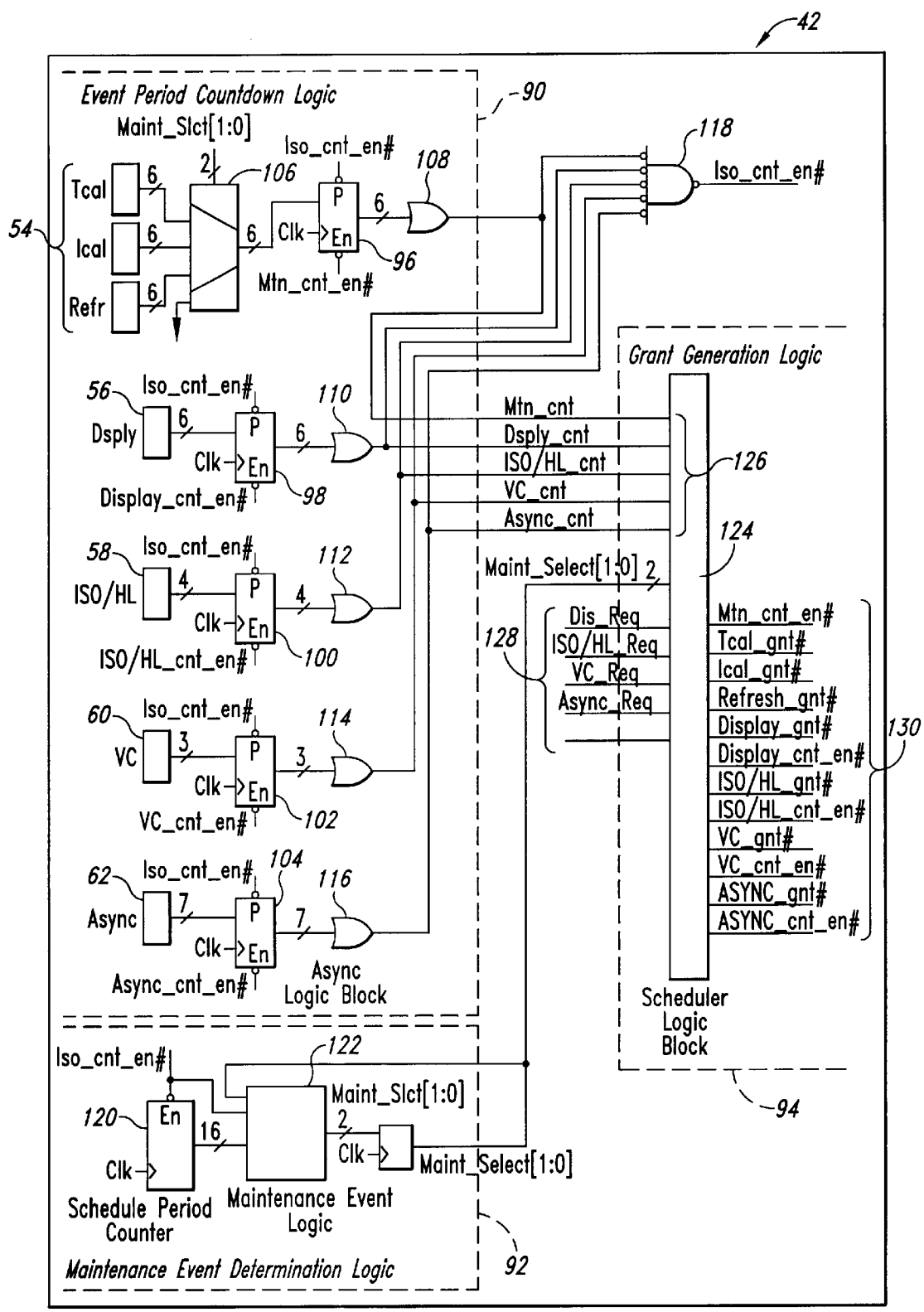
FIG. 4 is a block diagram of an embodiment of an arbiter that can use the method and memory schedule period shown in FIGS. 2 and 3.

FIG. 4 is a block diagram of an illustrative embodiment of the memory arbiter 42 that can use the above-described arbitration scheme. Other embodiments of the memory arbiter 42 besides what is shown in FIG. 4 can also be used. The three components of the arbiter 42 include an Event Period Countdown Logic Block 90, a Maintenance Event Determination Logic Block 92, and a Grant Generation Logic Block 94.

The Event Period Countdown Logic Block 90 comprises counters 96–104 corresponding to the maintenance block 54 (e.g., the Tcal, Ical, and Refresh maintenance operations), display block 56, ISO_HL block 58, video capture block 60, and CPU_I/O block 62. Outputs of the counters 96–104 are respectively coupled to OR gates 108–116, whose outputs are in turn inverted inputs for an AND gate 118. The output of the AND gate 118 is inverted to produce an ISO_cnt_en# signal.

Each counter 96–104 is clocked by a clock signal Clk. The ISO_cnt_en# signal preloads or initializes registers in the counters 96–104 after the end of each schedule period 52, when all of the counters 96–104 have reached zero. Each counter 96–104 further has enable lines, such as a Display_cnt_en# for the counter 98 of the display block 56, that initiates the service period countdown for that particular counter. In operation, as one counter's service period expires, a next counter's service period begins, as enabled by a signal at its *_en# line. When all service periods have ended, the Iso_cnt_en# signal is generated to reset the counters 96–104 for the next schedule period.

The Event Period Countdown Block 90 further comprises a multiplexer 106 coupled between the maintenance block 54 and the counter 96. The multiplexer 106 includes a selection control line Maint_Slct [1:0] to select one of the Tcal, Ical, and Refresh maintenance operations and their corresponding service period counter settings. For example, the binary signals 11, 10, 01 can be respectively assigned for the Tcal, Ical, and Refresh maintenance operations, and the binary signal 00 can be used when no maintenance operation is required, thereby taking the counter 96 out of operation.

The Maintenance Event Determination Logic Block 92 comprises a schedule period counter 120 and a maintenance event logic block 122. The schedule period counter 120 is clocked by the Clk clock signal and counts the number of schedule periods 52, using the Iso_cnt_en# signal to distinguish the beginning of each schedule period. Based on the output of the schedule period counter 120 that forms an input to the maintenance event logic block 122, the maintenance event logic block 122 determines when the Tcal, Ical, and Refresh maintenance operations will occur, and prioritizes these operations. For instance, the Refresh maintenance operation can be set to occur every four schedule periods, and so the maintenance event logic block 122 generates the 01 binary signal on the Maint_Slct [1:0] line every fourth schedule period, with the 01 binary signal on the Maint_Slct [1:0] line being in turn used to control the multiplexer 106 in the Event Period Countdown Logic Block 90.

Outputs 126 of the counters 96–104, such as a Dsply_cnt output from the display counter 98, and a Maint_Select [1:0] line from the maintenance event logic block 122 form inputs to a scheduler logic block 124 of the Grant Generation Logic Block 94. Request lines 128, such as a display request line Dis_Req, send isochronous and asynchronous requests to the scheduler logic block 124.

The Grant Generation Logic Block 94 uses the counter outputs 126 and maintenance operation prioritization information based on the signal on the Maint_Select [1:0] line to issue grant (*_gnt#) and enable (*_en#) signals on the output lines 130. Low *_en# signals, such as the Display_cnt_en# signal, are issued to enable corresponding counters 96–104 to begin their countdowns. High *_en# signals cause the corresponding counters 96–104 to suspend their countdown. The *_gnt# signals, such as the Display_gnt# signal, grant access to the shared memory 39 for the agent that requested access.

The arbiter 42 shown in FIG. 4 can operate in a manner according to the arbitration scheme shown in the flowchart 70 of FIG. 3 and previously described above. For example, if an asynchronous request is received on the Async_Req line (located at the inputs 128 to the scheduler logic block 94) while the display counter 98 is counting down its service period, the display counter 98 is suspended by disabling its Display_cnt_en# line. The asynchronous request is then serviced by enabling the Async_cnt_en# line of the asynchronous counter 104 and generating the ASYNC_gnt# signal from the scheduler logic block 94, provided that time remains in the asynchronous counter 104 or there are no isochronous requests pending. If the asynchronous request cannot be serviced, then the ASYNC_gnt# signal is delayed until the next schedule period, after the Iso_cnt_en# signal is generated to reset the counters 96–104.

If a maintenance operation is signaled from the maintenance block 54, both the maintenance counter 96 and the asynchronous counter 104 count down, regardless of whether or not there is a pending asynchronous request. If there is no maintenance operation signaled, then only the asynchronous counter 104 counts down when a pending asynchronous request is serviced. In this fashion, the amount of time to service an asynchronous request is made variable depending on whether a maintenance operation is scheduled.

Various modifications can be made to the memory arbiter 42 or to the arbitration scheme, as those skilled in the relevant art will recognize based on the description herein. For example, it is possible to provide embodiments where time from one or more of the isochronous counters 98–102 can be allocated to any of the other isochronous counters or to the asynchronous counter 104, if one of the isochronous service periods does not have a pending isochronous request. This optimizes the arbitration scheme by reducing idle memory time caused by the countdown of an unused isochronous service period. Further, although the embodiments described above perform the maintenance operations at the beginning of each schedule period 52, it is appreciated that the maintenance operations can be performed at any time during a given schedule period.

In summary, embodiments of the present invention schedule isochronous requests around asynchronous requests, in so far as possible while servicing the isochronous requests within the appropriate schedule period. Asynchronous requests are not delayed unless they are too numerous to be serviced in a single schedule period 52 (e.g., no time remains the service period allocated for asynchronous requests). Scheduled isochronous requests according to embodiments of the invention are easier to track, as compared to traditional priority-base arbitration techniques that interact at several places in a memory system to introduce delays. The compartmentalized nature of scheduled memory affords designers a tight, yet sufficient bound on the size of isochronous first-in-first-out (FIFO) buffers needed to avoid losing data. Tightly bounded buffer space requirements can further reduce memory controller costs.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

defining a schedule period for first and second types of memory requests;

receiving a memory request of the second type;

servicing the received memory request of the second type instead of a memory request of the first type during the schedule period if sufficient time remains in the schedule period to service both the received memory request of the second type and the memory request of the first type; and servicing the memory request of the first type instead of the received memory request of the second type during the schedule period if insufficient time remains in the schedule period to service both the memory request of the second type and all pending memory requests of the first type.

2. The method of claim 1 wherein the first type of memory request comprises an isochronous request.

3. The method of claim 1 wherein the second type of memory request comprises an asynchronous request.

4. The method of claim 1 wherein servicing the memory request of the first type instead of the received memory request of the second type during the schedule period comprises delaying service of the received memory request of the second type to a subsequent schedule period.

5. The method of claim 1 wherein defining a schedule period comprises defining service periods for the first and second types of memory requests, the method further comprising:

suspending the service period for the first type of memory request if the memory request of the second type is pending and if time remains in the service period for the second type of memory request;

servicing the pending memory request of the second type and correspondingly decrementing the service period for the pending second type of memory request; and resuming the service period for the first type of memory request after completing service of the pending memory request of the second type.

6. The method of claim 1 wherein defining a schedule period comprises defining service periods for the first and second types of memory requests, the method further comprising:

suspending service of the memory request of the first type during the service period for that memory request of the first type if there is a memory request of the second type pending and if time remains in the service period for the second type of memory request;

incrementing the service period for the second type of memory request and servicing the pending memory request of the second type; and resuming service of the memory request of the first type after completing service of the pending memory request of the second type.

7. The method of claim 1, further comprising:

scheduling maintenance operations and allocating time in one or more schedule periods for the maintenance operations; and correspondingly reducing time to service memory requests of the second type during schedule periods having a scheduled maintenance operation.

8. The method of claim 1 wherein if the memory request of the first type is received during the schedule period, that memory request of the first type is serviced in a subsequent schedule period.

9. The method of claim 1, further comprising determining a number of memory requests of the first type prior to a beginning of the schedule period.

10. A method, comprising:

defining a schedule period having a plurality of first service periods to service memory requests of a first type and a second service period to service a memory request of the second type;

sequentially decrementing each of the first service periods, wherein one of the first service period begins when a previous first service period ends, and servicing pending memory requests of the first type during their respective service periods;

suspending a service period of the memory request of the first type and servicing the memory request of the second type during the second service period of the schedule period if time remains in the second service period; and resuming the suspended service period of the memory request of the first type after servicing the memory request of the second type.

11. The method of claim 10 wherein the memory request of the first type comprises an isochronous memory request and the memory request of the second type comprises an asynchronous memory request.

12. The method of claim 10, further comprising delaying service of the memory request of the second type to a subsequent schedule period if no time remains in the second service period or if insufficient time remains in one or more of the first service periods to service their corresponding memory requests of the first type.

13. The method of claim 10, further comprising:

scheduling maintenance operations and allocating time in one or more schedule periods for the maintenance operations; and correspondingly reducing time of the second service periods during schedule periods having a scheduled maintenance operation.

14. The method of claim 10, further comprising:

scheduling maintenance operations and allocating time in one or more schedule periods for the maintenance operations;

correspondingly reducing time of the second service periods during schedule periods having a scheduled maintenance operation; and suspending the first service periods to perform the maintenance operations and resuming the first service periods after performing the maintenance operations.

15. The method of claim 10 wherein servicing the first and second types of memory requests comprises granting access to a memory.

16. The method of claim 10 wherein if the memory request of the first type is received during the schedule period, that memory request is serviced in a subsequent schedule period.

17. The method of claim 10, further comprising determining a number of memory requests of the first type prior to a beginning of the schedule period.

18. A method, comprising:

defining a schedule period for first and second types of memory requests;

receiving a memory request of the second type;

servicing the received memory request of the second type during the schedule period if time remains in the schedule period to service the received memory request of the second type; and otherwise servicing a pending memory request of the first type, if insufficient time remains in the schedule period to service both the received memory request of the second type and all pending memory requests of the first type.

19. The method of claim 18 wherein otherwise servicing the pending memory request of the first type further comprises delaying service of the received memory request of the second type to a subsequent schedule period.

20. The method of claim 18 wherein defining the schedule period further comprises allocating the schedule period between a first service period to service the memory request of the first type and a second service period to service a memory request of the second type service.

21. The method of claim 18 wherein servicing the received memory request of the second type during the schedule period comprises initially servicing that received memory request during that schedule period and completing service of that received memory request during a subsequent schedule period.

22. The method of claim 18 wherein the memory request of the first type comprises an isochronous memory request and the memory request of the second type comprises an asynchronous memory request.

23. A method, comprising:
substantially guaranteeing service to isochronous requests by allocating service periods for the isochronous requests;
servicing a pending isochronous request during its allocated service period;
reducing latency to service asynchronous requests by suspending an allocated service period for the isochronous request if time remains in a service period allocated for asynchronous service and correspondingly servicing a received asynchronous request; and
taking the suspended allocated service period for the isochronous request off suspension after servicing the received asynchronous request.

24. The method of claim 23, further comprising delaying service of the received asynchronous request if no time remains in the service period allocated for asynchronous service.

25. The method of claim 23 wherein substantially guaranteeing service to isochronous requests by allocating service periods for the isochronous requests comprises:
initially determining a number of pending isochronous requests before the isochronous requests are serviced; and
allocating service periods based on the number of pending isochronous requests determined.

26. The method of claim 23, further comprising:
scheduling a maintenance operation; and
preempting service to isochronous and asynchronous requests while the maintenance operation is performed.

27. A computer system, comprising:
a processor to generate asynchronous memory requests;
a memory coupled to the processor;
a bridge coupled to the memory to route isochronous and asynchronous memory requests; and
a memory arbiter to control service of the isochronous and asynchronous memory requests, the memory arbiter coupled to grant service to an asynchronous request if allocated time remains to service that asynchronous request, the memory arbiter coupled to grant service to an isochronous request otherwise, wherein the memory arbiter comprises service counters associated with asynchronous and isochronous requests, the service counters having allocated time that is capable of being decremented as a corresponding asynchronous or isochronous request is serviced.

28. The computer system of claim 27 wherein the memory arbiter is coupled to delay grant of service to the asynchronous request if insufficient time remains to service that asynchronous request.

29. The method of claim 1 wherein the second type of memory request comprises, an asynchronous request associated with an input/output device or with a processor.

* * * * *